C. S. ARTHUR.
SPRING TIRE.
APPLICATION FILED MAR. 6, 1916.
1,201,236.
Patented Oct. 17, 1916.
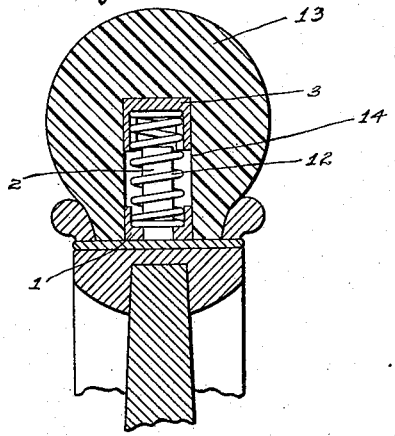
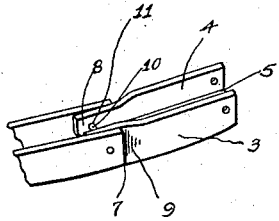
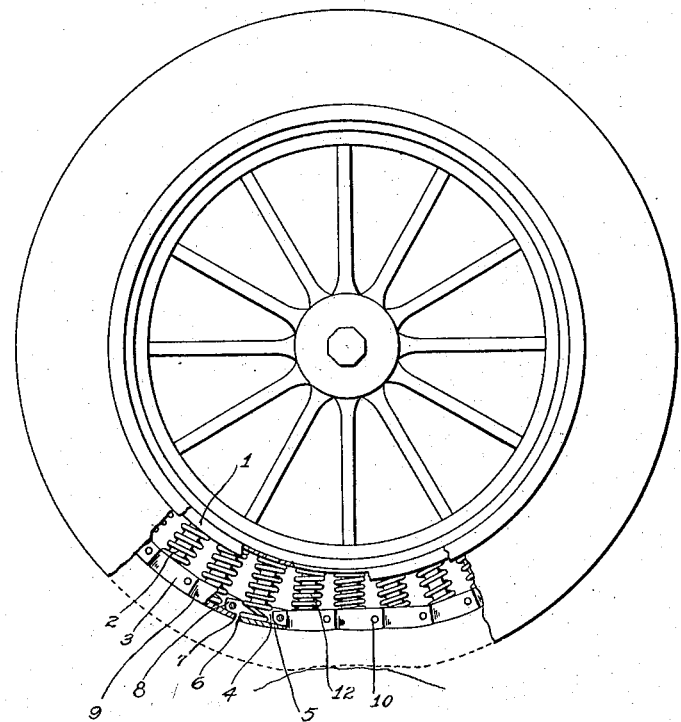
INVENTOR
Charles S. Arthur
By
La Porte, Bean & Graham
Att'ys.

UNITED STATES PATENT OFFICE.

CHARLES S. ARTHUR, OF LANE, ILLINOIS, ASSIGNOR OF ONE-HALF TO MARY A. PICKENS, OF SPRINGFIELD, ILLINOIS.

SPRING-TIRE.

1,201,236.     Specification of Letters Patent.     Patented Oct. 17, 1916.

Application filed March 6, 1916. Serial No. 82,504.

*To all whom it may concern:*

Be it known that I, CHARLES S. ARTHUR, a citizen of the United States, a resident of Lane, in the county of Dewitt and State of Illinois, have invented new and useful Improvements in Spring-Tires, of which the following is a specification.

My invention relates to improvements in spring tires and has for its object, the provision of a construction adapted to obviate the necessity of utilizing a pneumatic tire and at the same time, retain the resilience necessary in wheels of vehicles, automobiles and the like.

A further object is the provision of such a device which may be mounted on any of the standard forms of rims now in use.

To the accomplishment of the foregoing and such other objects as may hereinafter appear, my invention consists in the combination, construction and arrangement of parts hereinafter described and then sought to be defined in the appended claims, reference being had to the accompanying drawings forming a part hereof, and which shows merely for the purpose of illustrative disclosure, a preferred embodiment of my invention, it being understood that various changes may be made in practice within the scope of the claims without digressing from my inventive idea.

On the drawing, Figure 1 is a side elevation of a wheel equipped with a device constructed according to my invention, parts being broken away to facilitate disclosure. Fig. 2 is a vertical cross section thereof. Fig. 3 is a perspective view of two of the sections.

Broadly described, my invention includes an annular rim member adapted to be mounted on the rim or felly of a wheel, said annular rim member having a plurality of studs projected radially therefrom, and a series of links or sections pivotally connected together, receiving the studs which have coil springs positioned thereover, said device having an outer tire of rubber or the like mounted thereon, whereby a tire is provided which has all of the advantages of a pneumatic tire and which dispenses with its disadvantages.

Referring to the drawings, the numeral 1 designates the annular rim member which is preferably in the form of a channel as shown, and has the plurality of studs 2 projected radially therefrom at equi-distant intervals about its periphery.

3 designates the links or sections which are pivotally connected together and extend around the annular rim member in spaced relation thereto. Each section includes the side members 4 and the face member 5, being substantially of channel shape. The face member 5 of each section is cut away as at 6 to form an abutting edge 7, the side members 4 extending forwardly therefrom in the form of a pair of spaced plate members 8 which fit in between the side members 4 of the adjacent section or link, being inset or bent as at 9 for this purpose. Through the end portion of the link or section in which the spacing plate members fit, I provide the rivets or pins 10, the spaced plate members 8 being apertured as at 11 and journaled on said rivets or pins so that the sections have a certain pivotal movement relative to each other.

I mount on the studs 2 the coil springs 12 which engage the annular rim member 1 and also the sections or links 3, one stud and spring being provided for each link or section. The springs normally hold the sections in their outermost position, in which they are arranged at a slight angle to each other, with a slight space between the abutting edge 7 and the end of the adjacent section. However, upon the application of pressure, the sections assume a position in alinement, the abutting edge 7 engaging the end of the next adjacent section so as to form a flat bearing surface comprising several of the links or sections.

It is to be noted that the studs 2 extend within the side members 4 of each link or section and together with the spring are to bear against the ends of the plate members 8 or against the inset portions 9 of these plate members so as to prevent substantial movement of the sections relative to the annular rim member 1.

I provide an outer tire member 13 which is channeled as at 14 to receive the sections and annular rim 1 therewithin and form a protection for the structure from dirt and other foreign material.

It is therefore seen that I have provided a simply constructed spring tire which may be readily attached to existing forms of wheels, which is composed of few parts, not liable to get out of order and which is sufficiently resilient to give the proper riding qualities necessary for comfort and efficient use in vehicles. The relative arrangement of the studs and sections prevents circumferential movement of the parts relative to each other and the locking of the sections together when subjected to pressure, provides an extended bearing surface so as to distribute the stress and strain of service.

What I claim is:

1. A device of the character described including an annular rim member having a plurality of studs extending radially therefrom at spaced intervals, an outer rim member comprising a plurality of sections, each section being of channel shape in cross section and having its face portion cut away to form an abutting edge and having its side members extended in the form of plate members and bent so as to fit within the adjoining section, said abutting edge being adapted to engage the end of the adjoining section when the sections are arranged in substantial horizontal alinement so that adjoining sections form an extended bearing surface, a pin connected to each section and forming a pivot for the plate members of the adjoining section, and resilient means embracing the studs and engaging the annular rim member and the sections.

2. A device of the character described including an annular rim member having a plurality of studs extending radially therefrom at spaced intervals, an outer rim member comprising a plurality of sections, each section being of channel shape in cross section and having its face portion cut away to form an abutting edge and having its side members extended in the form of plate members and bent so as to fit within the adjoining section, said abutting edge being adapted to engage the end of the adjoining section when the sections are arranged in substantial horizontal alinement so that adjoining sections form an extended bearing surface, a pin connected to each section and forming a pivot for the plate members of the adjoining section, said studs extending within the side members of the sections and between the ends of the plate members and the bends in the side members of the adjoining section so as to prevent substantial relative movement of the parts, and resilient means embracing said studs and engaging the annular rim member and said sections.

CHARLES S. ARTHUR.

Copies of this patent may be obtained for five cents each, by addressing the "Commissioner of Patents, Washington, D. C."